(12) United States Patent
Nakasato

(10) Patent No.: US 6,182,099 B1
(45) Date of Patent: Jan. 30, 2001

(54) MULTIPLE LANGUAGE COMPUTER-INTERFACE INPUT SYSTEM

(75) Inventor: Shigemi Nakasato, Tokyo (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/031,048

(22) Filed: Feb. 26, 1998

(30) Foreign Application Priority Data

Jun. 11, 1997 (JP) .................................................... 9-153582

(51) Int. Cl.$^7$ .............................. G06F 15/00; G06F 17/00
(52) U.S. Cl. .......................................... 707/536; 707/532
(58) Field of Search .................................... 707/536, 531, 707/500, 526; 345/438; 364/725.01; 704/8, 9, 10, 277, 251–257, 231, 2

(56) References Cited

U.S. PATENT DOCUMENTS

| | | | |
|---|---|---|---|
| 5,361,205 | * 11/1994 | Nishino et al. | 364/419.02 |
| 5,535,120 | * 7/1996 | Chong et al. | 364/419.03 |
| 5,583,761 | * 12/1996 | Chou | 707/536 |
| 5,612,872 | * 3/1997 | Fujita | 707/536 |
| 5,634,134 | * 5/1997 | Kumai et al. | 707/536 |
| 5,677,835 | * 10/1997 | Carbonell et al. | 364/419.02 |
| 5,844,798 | * 12/1998 | Uramoto | 364/419.02 |

FOREIGN PATENT DOCUMENTS

H5-282360   10/1993   (JP) .

* cited by examiner

Primary Examiner—Joseph H. Feild
Assistant Examiner—Alford W. Kindred
(74) Attorney, Agent, or Firm—Pillsbury Madison & Sutro LLP

(57) ABSTRACT

A multiple language input system of this invention includes input systems corresponding to a plurality of languages. This multiple language input system recognizes a target language in accordance with various pieces of information from an application or information set by an environment setting function in the multiple language input system. When the target language is Japanese, the system causes a Japanese processing section to perform Japanese input processing. When the target language is English, the system causes an English processing section to perform English input processing. When the target language is Chinese, the system causes a Chinese processing section to perform Chinese input processing.

3 Claims, 11 Drawing Sheets

FIG. 8A

| CONDITIONS FOR SWITCHING TO JAPANESE INPUT MODE |
|---|
| JAPANESE MING-CHO FONT |
| JAPANESE BRUSH FONT |
| JAPANESE BLOCK STYLE FONT |

FIG. 8B

| CONDITIONS FOR SWITCHING TO CHINESE INPUT MODE |
|---|
| CHINESE MING-CHO FONT |
| CHINESE BLOCK STYLE FONT |

FIG. 8C

| CONDITIONS FOR SWITCHING TO ENGLISH INPUT MODE |
|---|
| JAPANESE GOTHIC FONT |
| CHINESE GOTHIC FONT |
| EUROPEAN LANGUAGE FONT |

(HIGH PRIORITY) JAPANESE > ENGLISH > CHINESE (LOW PRIORITY)

FIG. 9

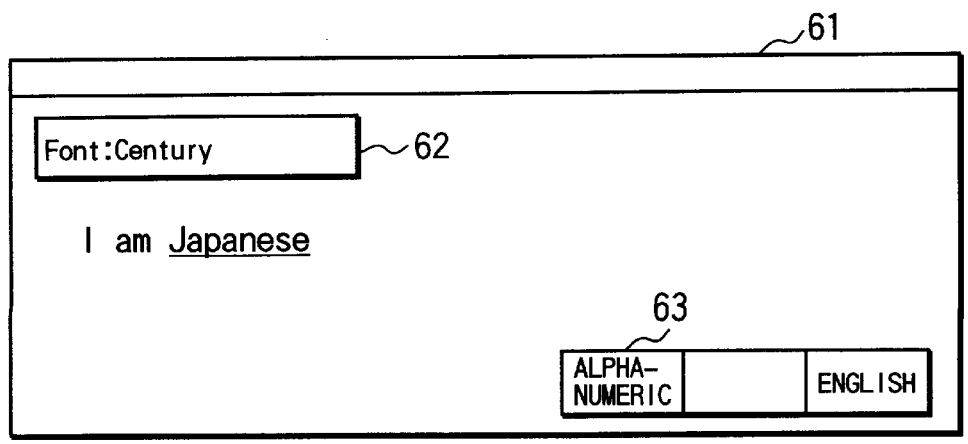

FIG. 10

MULTIPLE LANGUAGE COMPUTER-INTERFACE INPUT SYSTEM

BACKGROUND OF THE INVENTION

The present invention relates to a multiple language input system which can be applied to a document preparation apparatus using a personal computer and the like and, more particularly, to a multiple language input system capable of inputting a plurality of different languages.

This application is based on Japanese Patent Application No. 9-153582, filed on Jun. 11, 1997, the contents of which are incorporated herein by reference.

In a document preparation apparatus implemented by electronic equipment such as a personal computer, a document is created by using a language input system. The language input system is software having functions required for language input processing and used together with a document preparation application (wordprocessor software).

Conventionally, such a language input system is provided for each language. For example, a Japanese input system is provided for the input of Japanese characters; an English input system, for the input of English characters; and a Chinese input system, for the input of Chinese characters. That is, a dedicated input system for each language is provided. When, therefore, a plurality of different languages are to be input, a plurality of types of language input systems must be prepared (installed in a hard disk unit) and properly switched and used every time each language is input.

Such language input systems may have functions unique to the respective languages. For example, the Japanese input system has a kana/kanji conversion function of converting kana characters into kanji characters. The English input system has a spelling check function of checking whether input words are correctly spelled. The Chinese input system has a pin yin conversion function. Pin yin conversion corresponds to Japanese kana/kanji conversion. In pin yin conversion, Chinese characters are input phonetically with the English alphabet. Such functions unique to the respective languages may be required occasionally or essentially.

Conventionally, therefore, when a plurality of different languages are to be input, a plurality of types of language input systems respectively having unique functions are required, and must be switched and used to input each language. A heavy load is therefore imposed on an unskilled user. When a document is to be created using a plurality of languages, in particular, the input systems for the respective languages must be frequently switched, resulting in difficulty in efficiently writing a document.

The above spelling check function has been implemented as a function of an English document preparation application (European Language wordprocessor). For this reason, when the application is changed (from, e.g., the European Language wordprocessor to the Japanese wordprocessor), spelling check cannot be performed even though English words can be input on the changed application in the alphanumeric shift mode.

A technique of automatically switching a plurality of language input systems prepared in a document preparation apparatus is disclosed in Jpn. Pat. Appln. KOKAI Publication No. 5-282360. According to this reference, however, the respective language dictionaries (the Japanese dictionary, the Korean dictionary, and the Chinese dictionary) are searched on the basis of an input character string, and the input language is determined from the search result (the number of unknown words). If, therefore, many languages are input, all the dictionaries corresponding to the number of languages must be searched. For this reason, it takes much time to execute functions unique to the respective languages such as conversion.

BRIEF SUMMARY OF THE INVENTION

The present invention provides a multiple language input system which can input a plurality of languages and can efficiently create a document by automatically switching input system in accordance with a target language.

The second embodiment of the present invention to provides a multiple language input system which can use a spelling check function regardless of the application in use.

According to the first aspect of the present invention, there is provides a multiple language input system comprising: an input portion for inputting character data; a plurality of language dictionaries each storing word information about a corresponding one of different languages; a plurality of language processing portion provided for the respective languages, each of the language processing portion processing the input character data in accordance with the word information in a corresponding one of the plurality of language dictionaries; and control portion for enabling one of the plurality of language processing portion in accordance with an input target language.

In the system, the control portion includes recognition portion for recognizing the input target language as one of the plurality of languages, and enables one of the language processing portions in accordance with the recognition result obtained by the recognition portion.

According to the second aspect of the present invention, there is a multiple language input method applied to a computer system, comprising provides: inputting character data; recognizing an input target language as one of a plurality of languages; enabling one of a plurality of language processing sections, each having word information provided for a corresponding one of the plurality of languages, in accordance with the recognition result obtained in provides recognizing the input target language; and processing the input character data by using the word information in the enabled language processing section.

According to the third aspect of the present invention, there is a memory storing computer-executable program code for performing input processing for a plurality of languages, the program code comprising: a first portion for causing a computer to input character data; a second portion for causing a computer to recognize an input target language as one of a plurality of languages; a third portion for causing a computer to enable one of a plurality of language processing sections, each having word information provided for a corresponding one of the plurality of languages, in accordance with the recognition result; and a fourth portion for causing a computer to process the input character data by using the word information in the enabled language processing section.

According to the present invention, input systems for a plurality of languages are prepared and can be properly switched and used. A document using a plurality of languages can therefore be efficiently created without preparing dedicated input systems for the respective languages as in the prior art.

In addition, according to the present invention, an input target language is recognized on the basis of, for example, the font or format information or the like set on the application side or the switching information set on the input system side, and the respective language input systems are automatically switched in accordance with the input target language. Input processing corresponding to each language can therefore be performed without requiring the user to perform a switching operation for input processing in each language. In this case, since the respective language input systems can be automatically switched without requiring any complicated processing such as searching each language dictionary, the input system corresponding to the input target language can be quickly driven.

Furthermore, according to the present invention, a spelling check function may be implemented as a function of the input system. With this arrangement, the spelling check function can be used regardless of the type of application in use.

Additional objects and advantages of the invention will be set forth in the description which follows, and in part will be obvious from the description, or may be learned by practice of the invention. The objects and advantages of the invention may be realized and obtained by portion of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

FIGS. 8A to 8C are views showing conditions for the recognition of an input target language;

FIG. 9 is a view showing the priority order of languages in a case in which any specific input target language cannot be determined;

FIG. 10 is a view showing a sample window displayed upon detection of a spelling mistake;

DETAILED DESCRIPTION OF THE INVENTION

An embodiment of the present invention will be described below with reference to the accompanying drawing.

Figure 1:
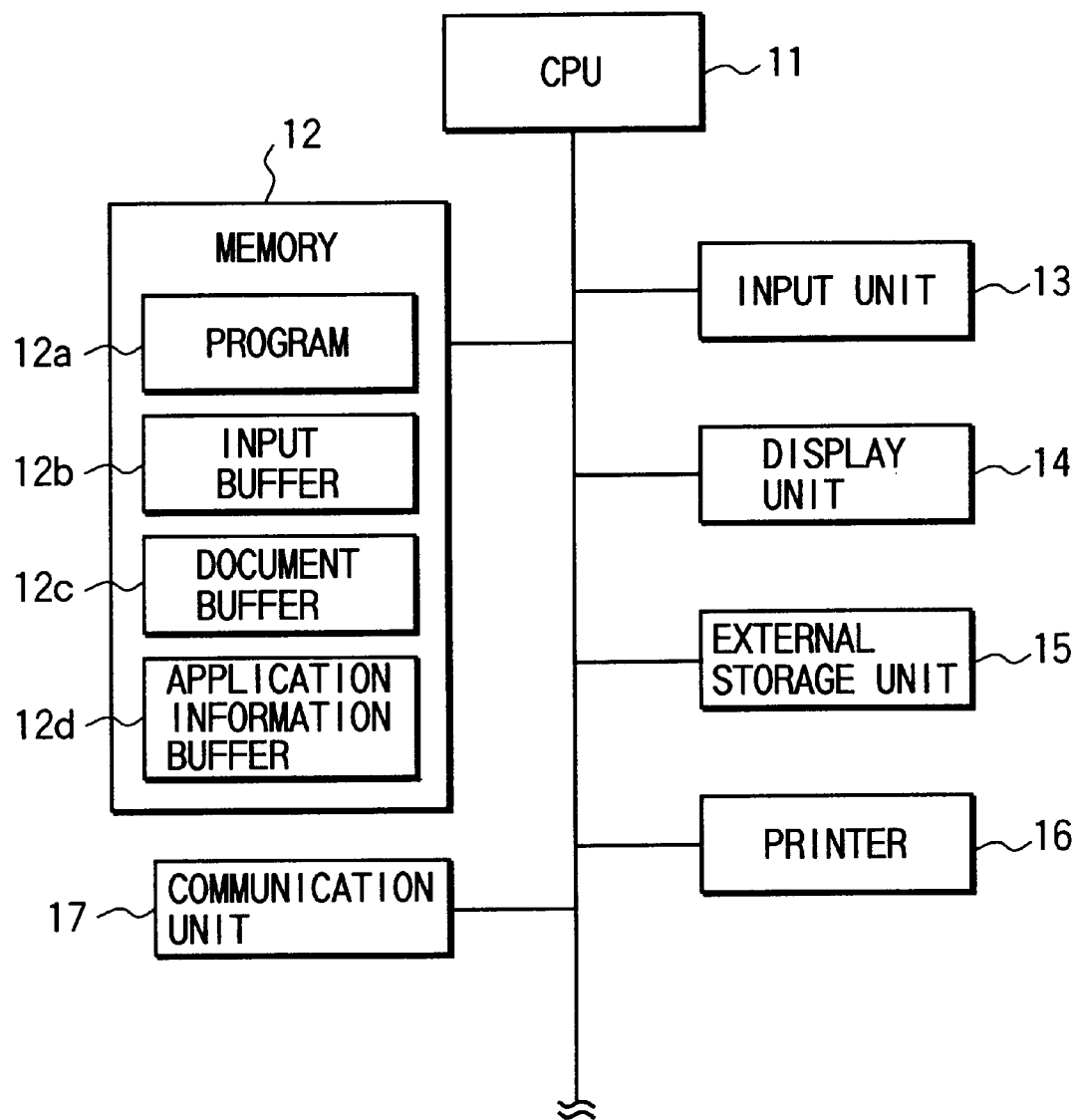
FIG. 1 is a block diagram showing the arrangement of a document preparation apparatus using a multiple language input system according to an embodiment of the present invention.

FIG. 1 is a block diagram showing the system configuration of a document preparation apparatus to which a multiple language input system according to an embodiment of the present invention is applied. Note that the document preparation apparatus of this embodiment is implemented by a computer which is controlled in accordance with the programs loaded from a recording medium such as a magnetic disk.

As shown in FIG. 1, the document preparation apparatus of this embodiment is constituted by a CPU (Central Processing Unit) 11, a memory 12, an input unit 13, a display unit 14, an external storage unit 15, a printer 16, and a communication unit 17.

The CPU 11 controls the overall operation of this document preparation apparatus in accordance with various programs.

The memory 12 is constituted by a ROM (Read-Only Memory) or a RAM (Random Access Memory) and used to store the programs and various data used in the document preparation apparatus. The memory 12 has a program area 12a for storing a document preparation application (wordprocessor software) and programs for implementing the multiple language input system, an input buffer 12b for storing character strings input to create a document, a document buffer 12c for storing the document data obtained by various types of language processing (kana/kanji conversion and the like), and an application information buffer 12d set in accordance with the activation of an application.

For example, the input unit 13 is constituted by a keyboard or a mouse and used to input commands and data to this document preparation apparatus. This input unit 13 has conversion keys for designating various types of conversion, e.g., kana/kanji conversion, an alphanumeric shift key for the input of alphanumeric characters, and the like as well as letter keys.

For example, the display unit 14 is constituted by a CRT (Cathode Ray Tube) or an LCD (Liquid Crystal Display) and used to display the character strings input through the input unit 13 and various language processing results (kana/kanji conversion result and the like).

For example, the external storage unit 15 is constituted by a HDD (Hard Disk Drive) or a CD-ROM (Compact Disc Read-Only Memory) and used to store various programs, data, and the like. The application program provided from a recording medium and programs for implementing the multiple language input system can also be stored in the external storage unit 15.

The printer 16 is used to print documents. The printer 16 may be incorporated in this document preparation apparatus or externally connected thereto.

The communication unit 17 controls data exchange with an external unit through a LAN (Local Area Network), a communication network, or the like.

The functions of the document preparation apparatus will be described next.

Figure 2:
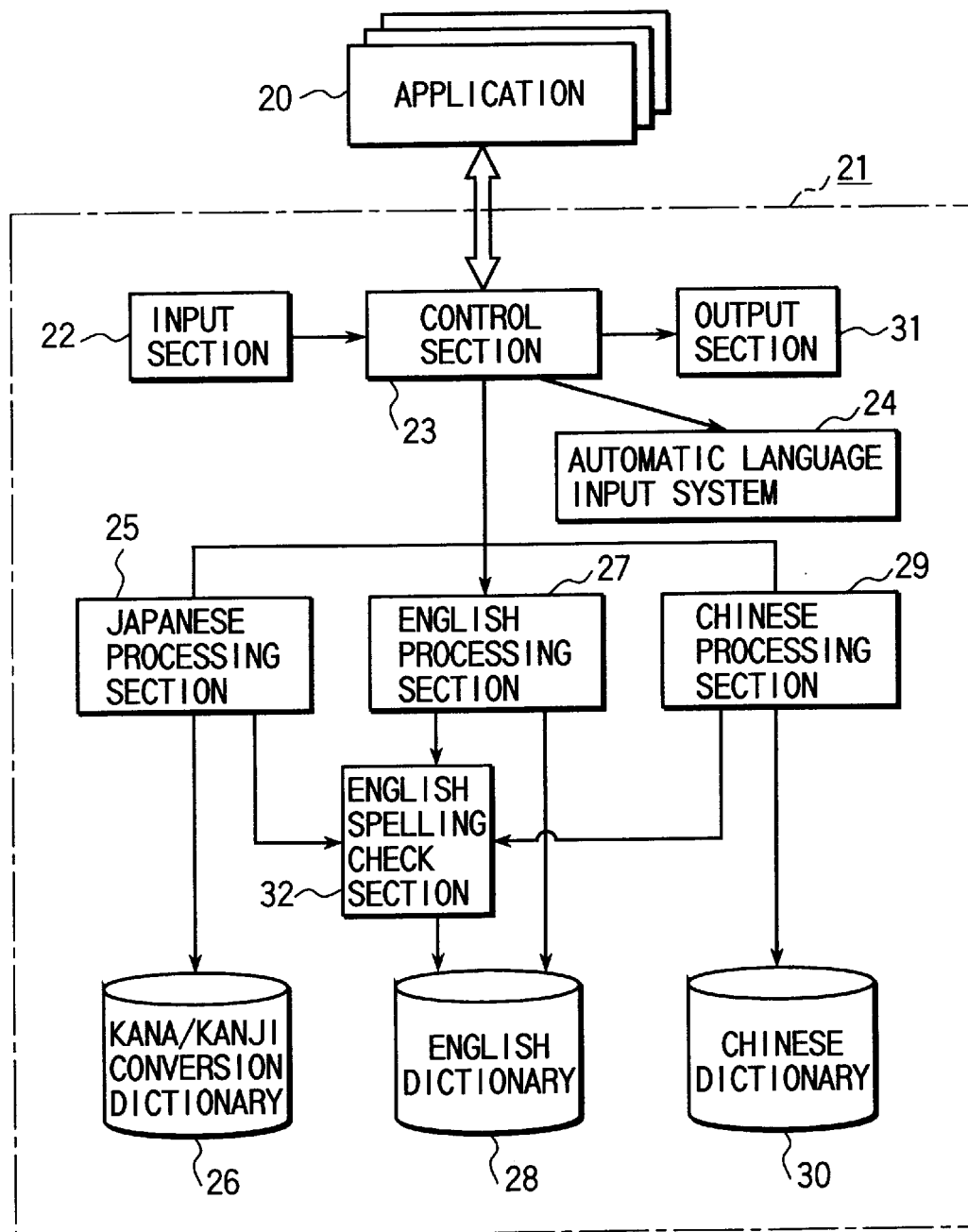
FIG. 2 is a block diagram showing the functional arrangement of the document preparation apparatus implemented by the arrangement shown in FIG. 1.

FIG. 2 is a block diagram showing the functional arrangement of the document preparation apparatus in FIG. 1. As shown in FIG. 2, the functions of the document preparation apparatus of this embodiment are roughly classified into a set of applications 20 and a multiple language input system 21.

The set of applications 20 implements a wordprocessor in the computer and includes three types, i.e., Japanese, English, and Chinese, of applications in this embodiment. Each application 20 slots a font, a format (vertical/horizontal writing), and the like in accordance with each language.

The multiple language input system 21 performs input processing for each language. As described above, to perform input processing for a plurality of languages, dedicated input systems for the respective languages, e.g., a Japanese input system, an English input system, and a Chinese input system, have been used. In contrast to this, according to the present invention, the multiple language input system 21 incorporates input systems for a plurality of languages, and internally switches and uses them. In this case, the multiple language input system 21 incorporates three types, i.e., Japanese, English, and Chinese, of input systems.

Note that the applications 20 and the multiple language input system 21 can be implemented by software. In this embodiment, the applications 20 and the multiple language input system 21 are installed in the external storage unit 15 in FIG. 1 and stored in the program area 12a of the memory 12 when the wordprocessor is activated. The CPU 11 loads the applications 20 and the multiple language input system 21 stored in the program area 12a and executes document preparation processing.

The functional arrangement of the multiple language input system 21 will be described below.

The multiple language input system 21 includes an input section 22, a control section 23, an automatic language recognition section 24, a Japanese processing section 25, a kana/kanji conversion dictionary 26, an English processing section 27, an English dictionary 28, a Chinese processing section 29, a Chinese dictionary 30, an output section 31, and an English spelling check section 32.

The input section 22 loads the data input in accordance with the operation of the input unit 13 which is performed by an operator, and sends it to the control section 23.

The control section 23 controls each processing section in accordance with the input data from the input section 22. In this case, the control section 23 performs switching control of the language modes in accordance with the language to be used for input (input target language). The language modes include three modes, namely a Japanese mode, an English mode, and a Chinese mode. That is, the control section 23 performs switching control to perform Japanese input processing using the Japanese processing section 25 in the Japanese mode; English input processing using the English processing section 27 in the English mode; and Chinese input processing using the Chinese processing section 29 in the Chinese mode. In addition, the control section 23 receives application information (setting information such as a font and format corresponding to each language and information indicating the application type) from the application 20, or sends information such as processing results to the application 20.

The automatic language recognition section 24 recognizes an input target language on the basis of information (setting information such as a font and format corresponding to each language and information indicating the application type) from the application 20 or the information set by an environment setting function on the multiple language input system 21 side (information about conditions and priority set for each language).

The Japanese processing section 25 corresponds to the Japanese input system. When Japanese characters are input, the Japanese processing section 25 performs kana/kanji conversion processing by referring to the kana/kanji conversion dictionary 26. When letters are input in the alphanumeric shift mode, the Japanese processing section 25 accesses the English spelling check section 32. This spelling check section 32 detects a spelling error by referring to the English dictionary 28. Word information required for kana/kanji conversion processing is stored in the kana/kanji conversion dictionary 26.

The English processing section 27 corresponds to the English input system, and performs English input processing (spelling check) by searching the English dictionary 28. English word information is stored in the English dictionary 28.

The Chinese processing section 29 corresponds to the Chinese input system. When Chinese characters are input, the Chinese processing section 29 performs pin yin conversion processing by referring to the Chinese dictionary 30. When letters are input in the alphanumeric shift mode, the Chinese processing section 29 accesses the English spelling check section 32. This spelling check section 32 detects a spelling error by referring to the English dictionary 28. Word information required for pin yin conversion processing is stored in the Chinese dictionary 30. Pin yin conversion processing corresponds to Japanese kana/kanji conversion processing.

The output section 31 displays the information managed on the multiple language input system 21 on the display unit 14.

Various windows displayed on the display unit 14 of this document preparation apparatus will be described next.

The English spelling check section 32 is a check section for checking whether English words are spelled correctly in the input mode for each language.

Figure 3:
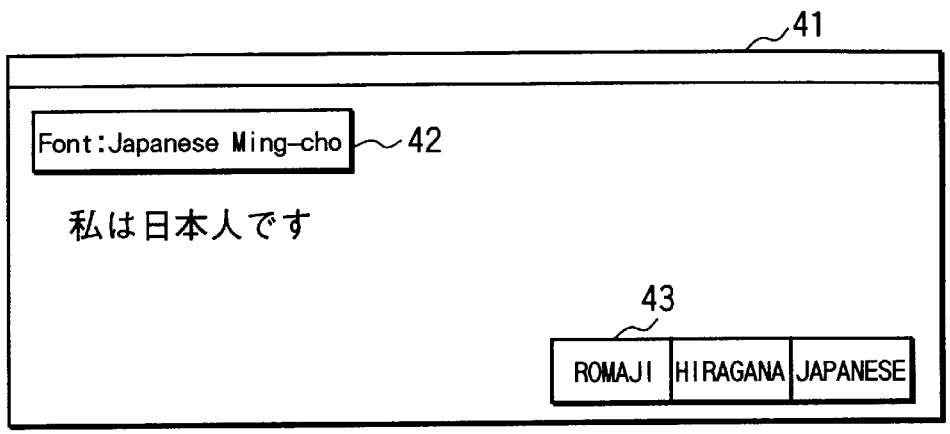
FIG. 3 is a view showing a sample window displayed when a Japanese sentence is input by using a Japanese font.

FIG. 3 shows an example of the window displayed when a Japanese sentence is input by using a Japanese font. In the Japanese mode, a Japanese input window 41 like the one shown in FIG. 3 is displayed. This Japanese input window 41 has a font type display portion 42 indicating the type of font currently set on the application 20 side, and an input mode display portion 43 indicating the input mode managed on the multiple language input system 21 side.

The window shown in FIG. 3 indicates "Japanese Ming-Cho" as a font type, and "Japanese input state" as an input mode. In addition, this window indicates that "romaji input" and "hiragana shift" are set.

Figure 4:
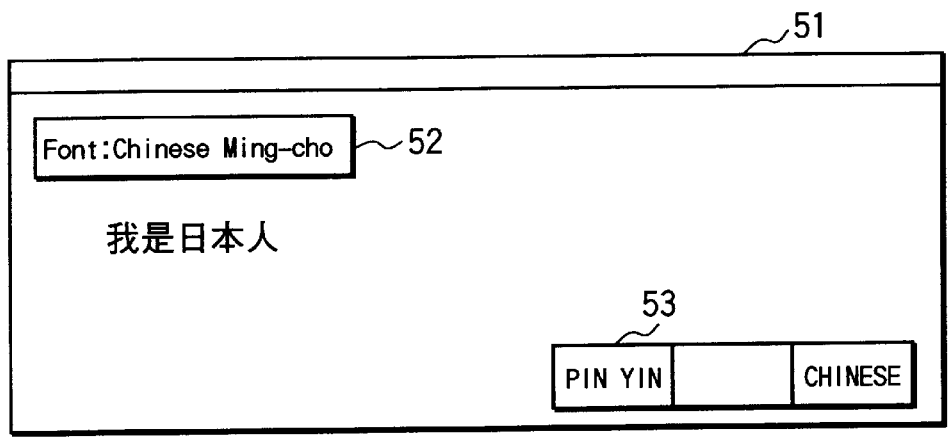
FIG. 4 is a view showing a sample window displayed when a Chinese sentence is input by using a Chinese font.

FIG. 4 shows an example of the window displayed when a Chinese sentence is input by using a Chinese font. In the Chinese mode, a Chinese input window 51 like the one shown in FIG. 4 is displayed. This Chinese input window 51 has a font type display portion 52 indicating the type of font currently set on the application 20 side, and an input mode display portion 53 indicating the input mode managed on the multiple language input system 21 side.

The window shown in FIG. 4 indicates "Chinese Ming-Cho" as a font type, and "Chinese input state" as an input mode. In addition, this window indicates that "pin yin input" is set.

Figure 5:
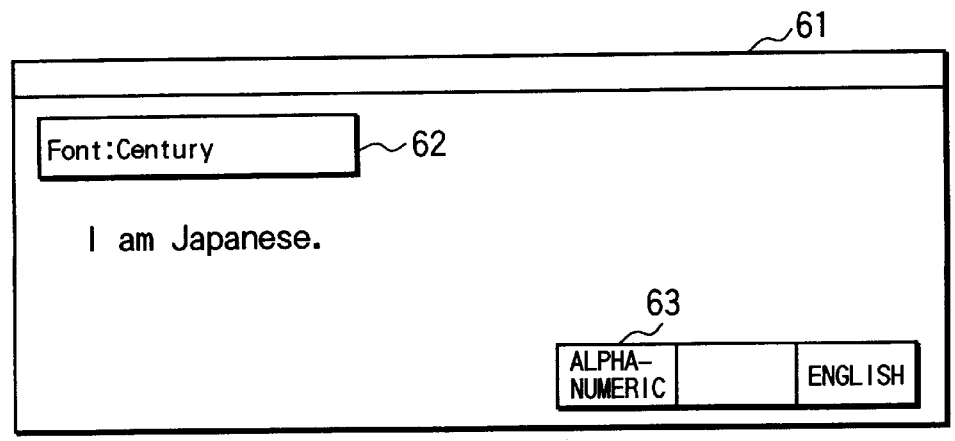
FIG. 5 is a view showing a sample window displayed when an English sentence is input by using an European Language font.

FIG. 5 shows an example of the window displayed when an English sentence is input by using a European Language font. In the English mode, an English input window 61 like the one shown in FIG. 5 is displayed. This English input window 61 has a font type display portion 62 indicating the type of font currently set on the application 20 side, and an input mode display portion 63 indicating the input mode managed on the multiple language input system 21 side.

The window shown in FIG. 5 indicates "Century" as a font type, and "English input state" as an input mode.

Figure 6A:
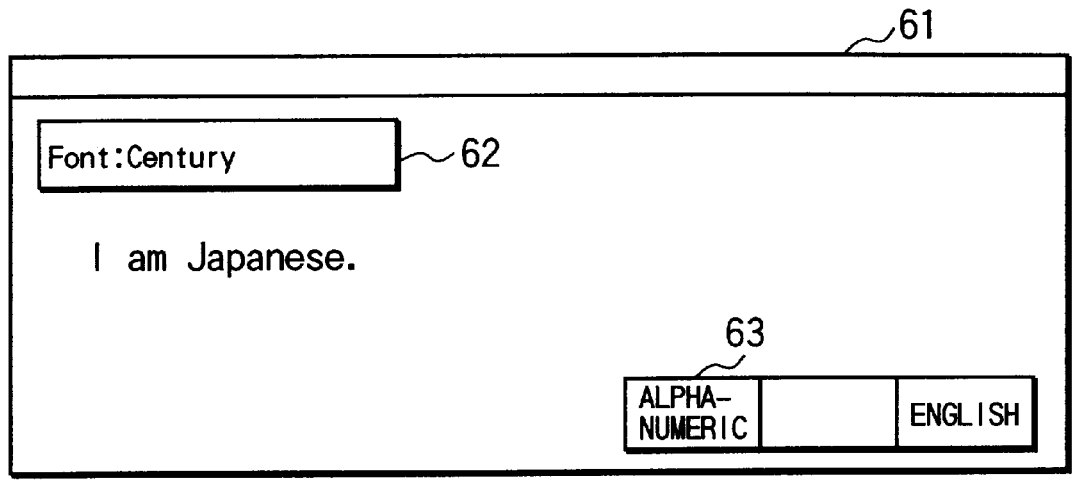
FIGS. 6A and 6B are views showing sample windows to explain how a window for inputting an English sentence is changed to a window for inputting a Japanese sentence in vertical writing.
Figure 6B:
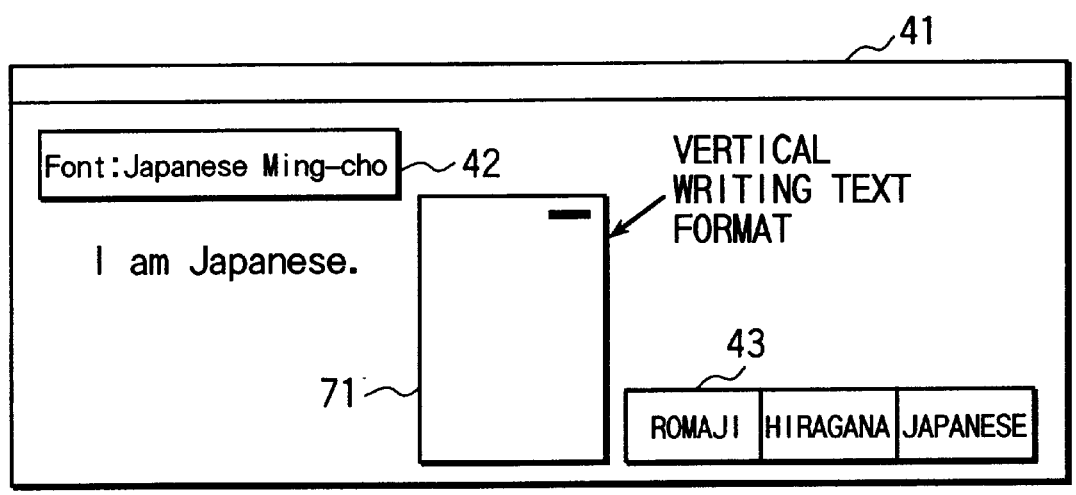

FIGS. 6A and 6B show sample windows displayed before and after the format is changed to vertical writing. As shown in FIG. 6A, when the format on the application 20 side in the English mode is set to vertical writing, it is recognized that the input target language is Japanese. As a result, the English mode is switched to the Japanese mode, and the Japanese input window 41 like the one shown in FIG. 6B is displayed.

In this case, a vertical writing text box 71 is displayed in the Japanese input window 41, and the font type is switched to a Japanese font. That is, even in the window in which English characters are input in the English mode, the English mode is switched to the Japanese mode at the same time when the format is set to vertical writing.

Figure 7A:
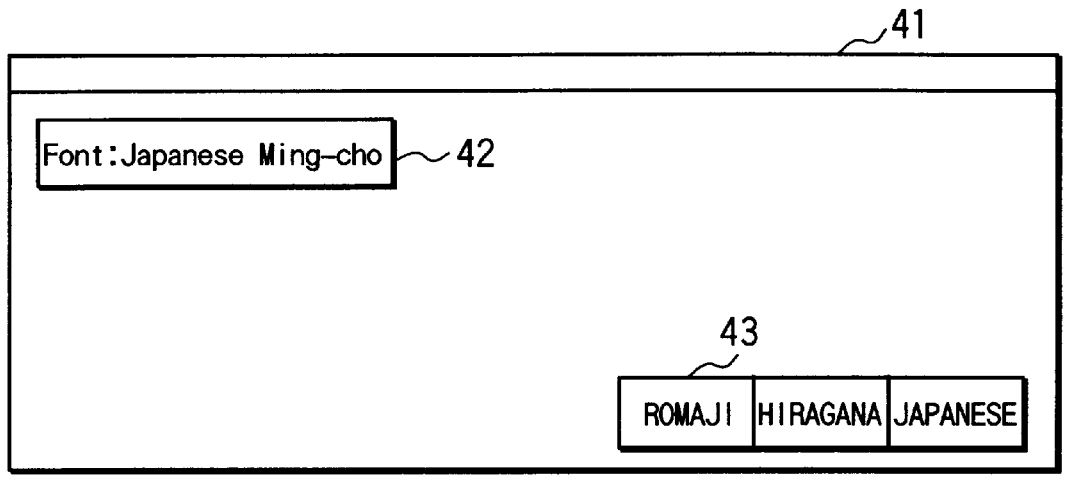
FIGS. 7A and 7B are views showing sample windows to explain a case in which the application for Japanese is switched to the application for English.
Figure 7B:
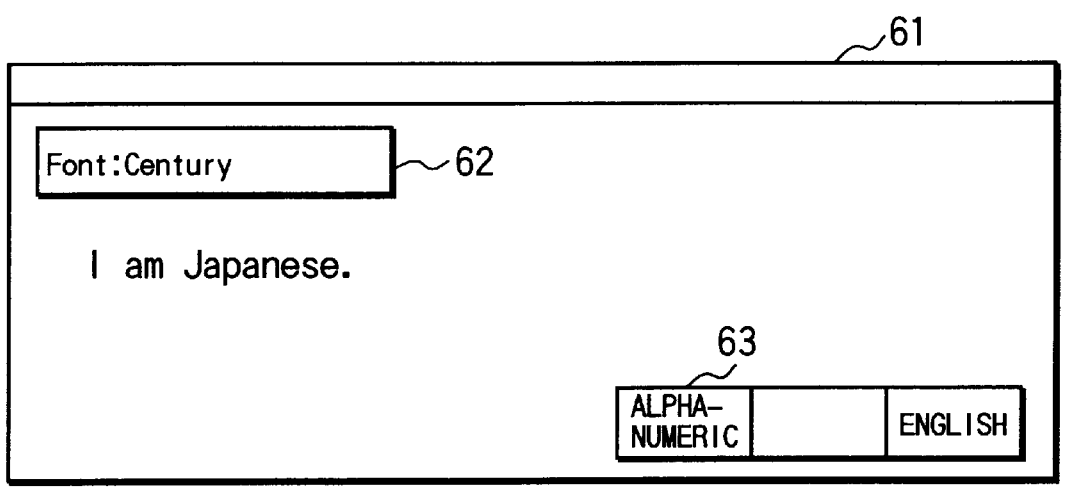

FIGS. 7A and 7B show sample windows displayed before and after the application 20 for Japanese is switched to the application 20 for English. As described above, the set of applications 20 includes the applications 20 for Japanese, English, and Chinese. Assume that the application 20 for Japanese is used, and the Japanese input window 41 like the one shown in FIG. 7A is displayed. When the user switches the application 20 for Japanese to the application 20 for English, it is recognized that the input target language is English. As a result, the Japanese mode is switched to the English mode, and the displayed window is switched to the English input window 61 like the one shown in FIG. 7B.

FIGS. 8A to 8C show conditions for the recognition of target languages. In this document preparation apparatus, the user can arbitrarily set conditions for the recognition of target languages in advance by using the environment setting function on the multiple language input system 21 side. FIG. 8A shows the conditions for switching to the Japanese input mode. FIG. 8B shows the conditions for switching to the Chinese input mode. FIG. 8C shows the conditions for switching to the English input mode.

These set conditions are set in the automatic language recognition section 24. The automatic language recognition section 24 recognizes an input target language on the basis of these set conditions. If, for example, the Japanese Ming-Cho font is set, the input target language is recognized as Japanese. If the Chinese Ming-Cho font is set, the input target language is recognized as Chinese. If a European Language font (Century, Times New Roman, or the like) is set, the target language is recognized as English.

FIG. 9 shows the order of priority of the respective languages for a case in which an input target language cannot be determined. The user can arbitrarily set priorities for the respective languages by using the environment setting function on the multiple language input system 21 side. In the case shown in FIG. 9, the priories given to Japanese, English, and Chinese decrease in this order.

This priority information is set in the automatic language recognition section 24 like the above set conditions. When any specific target language cannot be determined, the automatic language recognition section 24 recognizes an input target language in accordance with the priority information. For example, this technique is effective when the conditions for switching to the Japanese input mode in FIG. 8A are the same as those set for switching to the English input mode in FIG. 8C.

FIG. 10 shows a sample window displayed when the multiple language input system 21 indicates a spelling mistake in an input character string. When the user makes a spelling mistake in an input word (English word) while inputting characters in the English mode, the English spelling check section 32 detects the spelling mistake, and displays the misspelled word with a warning mark (e.g., an underline).

Figure 11:
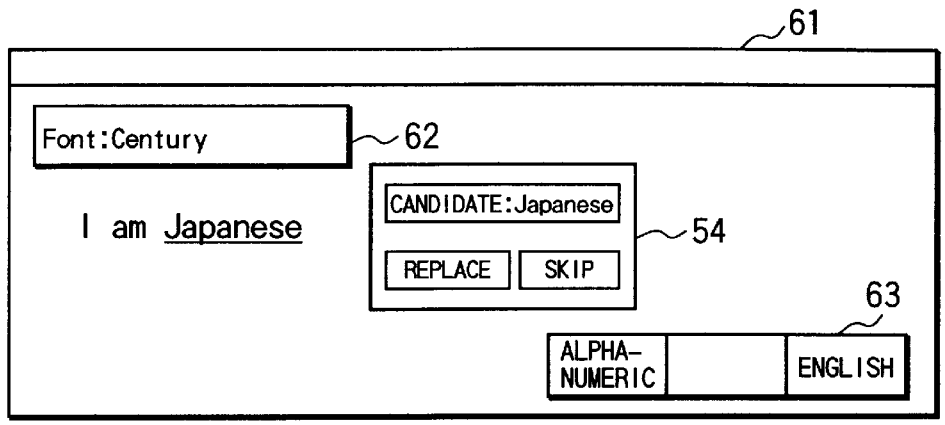
FIG. 11 is a view showing a sample window displayed upon detection of a spelling mistake in an input character string in the English mode.

FIG. 11 shows a sample window in which the multiple language input system 21 indicates a spelling mistake in an input character string, and a correct word candidate is displayed. When the user misspells an input word (English word) in the English mode, the English spelling check section 32 detects this spelling mistake, and displays the misspelled word with a warning mark (e.g., an underline) as in the case shown in FIG. 10. According to the sample window in FIG. 11, a correct word candidate display portion 64 is displayed in the English input window 61, and a correct word candidate corresponding to the above input word is displayed.

Figure 12:
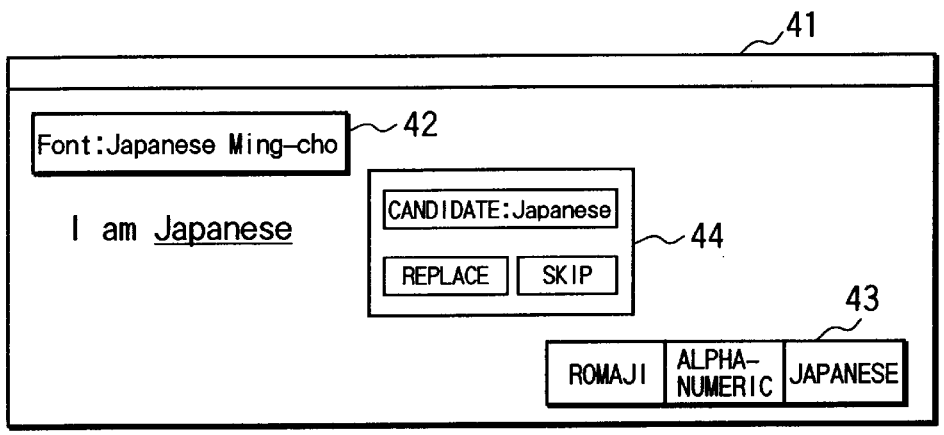
FIG. 12 is a view showing a sample window displayed upon detection of a spelling mistake in an input character string in the Japanese mode.

FIG. 12 shows a sample window in which the multiple language input system 21 indicates a spelling mistake in the words input in the alphanumeric shift mode in the Japanese mode, and displays a correct word candidate. When the user misspells a word (English word) input in the alphanumeric shift mode in the Japanese mode, the English spelling check section 32 detects this spelling mistake, and displays the misspelled word with a warning mark (e.g., an underline), as in the case shown in FIG. 10. In this case, according to the sample window shown in FIG. 12, a correct word candidate display portion 44 is displayed in the Japanese input window 41, and a correct word candidate corresponding to the above word is displayed.

Figure 13:
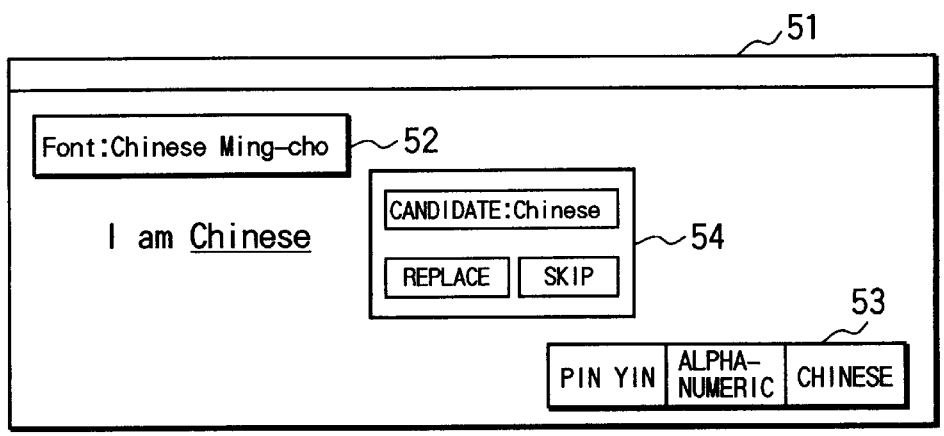
FIG. 13 is a view showing a sample window displayed upon detection of a spelling mistake in an input character string in the Chinese mode.

FIG. 13 shows a sample window in which the multiple language input system 21 indicates a spelling mistake in the words input in the alphanumeric shift mode in the Chinese mode, and displays a correct word candidate. When the user misspells a word (English word) input in the alphanumeric shift mode in the Chinese mode, the English spelling check section 32 detects this spelling mistake, and displays the misspelled word with a warning mark (e.g., an underline), as in the case shown in FIG. 10. In this case, according to the sample window shown in FIG. 13, a correct word candidate display portion 54 is displayed in the Chinese input window 51, and a correct word candidate corresponding to the above word is displayed.

The operation of this embodiment will be described next.

As described above, the multiple language input system 21 can input a plurality of languages. These languages can be automatically switched by the multiple language input system 21 as well as being switched by the operator (input system switching operation).

Figure 14:
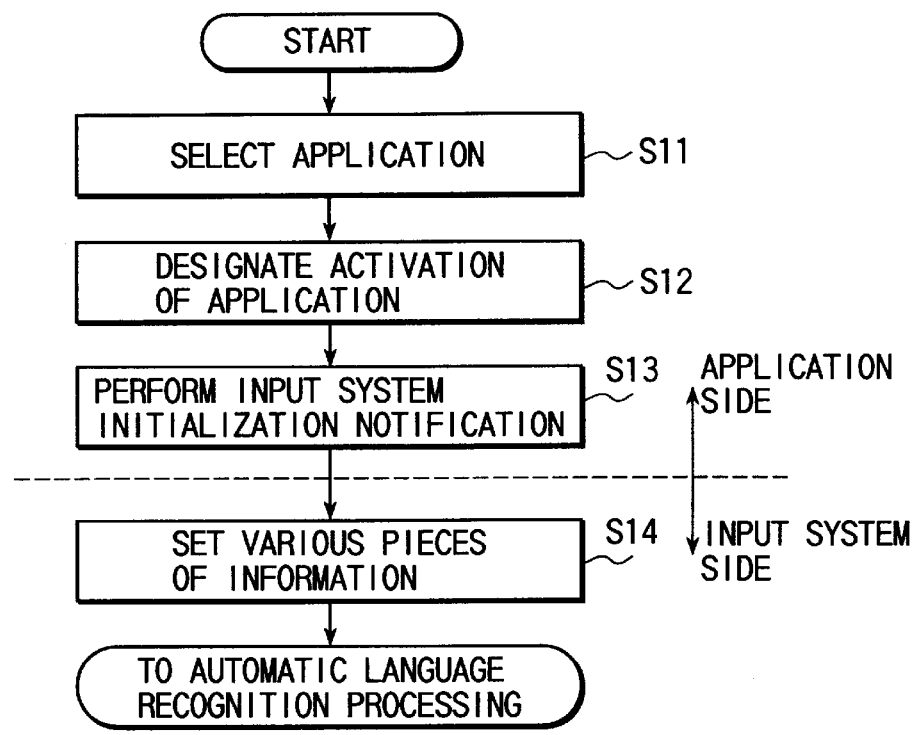
FIG. 14 is a flow chart showing notification processing of various pieces of information from an application to the multiple language input system.

Notification processing of various pieces of information from each application 20 to the multiple language input system 21 will be described first with reference to the flow chart of FIG. 14. FIG. 14 shows the flow of notification processing of various pieces of information from each application 20 to the multiple language input system 21.

When the user selects the application 20 with the input unit 13 constituted by a mouse, a keyboard, or the like (step S11), the selected application 20 is activated under the control of the OS (Operating System) installed in this document preparation apparatus in advance (step S12).

When the application 20 is activated, input system initialization notification is performed on the application 20 side (step S13). This input system initialization notification indicates that the default values of various pieces of information which can be set on the application 20 side are notified to the multiple language input system 21 side, together with a identifier indicating the type of the application 20.

The above identifier is information unique to each type of application, i.e., each of the applications for English, Japanese, and Chinese. The various pieces of information which can be set on the application 20 side include, for example, a font and format (vertical/horizontal writing) corresponding to each language. For example, in the default state, "Japanese Ming-Cho" is as a font type; and "horizontal writing", as a format.

When the default values of these pieces of information are notified to the multiple language input system 21 side, together with the application notification, the multiple language input system 21 receives these pieces of information, and sets them in the internal buffer mounted in the control section 23 (step S14). This buffer is implemented as the application information buffer of the memory 12, as shown in FIG. 1.

In this manner, when the application 20 is activated, the application identifier and the default values of various pieces of information are notified to the multiple language input system 21.

As described with reference to FIGS. 6A to 7B, every time the font or format is changed on the application 20 side, the application 20 notifies the multiple language input system 21 of the pieces of information set after the change. The multiple language input system 21 executes language recognition processing (to be described later) on the basis of these pieces of information.

Such notification is performed not only from the application 20 to the multiple language input system 21 but also from the multiple language input system 21 to the application 20. In this embodiment, when the format setting information obtained from the application 20 indicates vertical writing, the input target language is recognized as Japanese. In this case, if a font other than Japanese fonts is set on the application 20 side, the multiple language input system 21 notifies the application 20 of a message for switching to a Japanese font.

Figure 15:
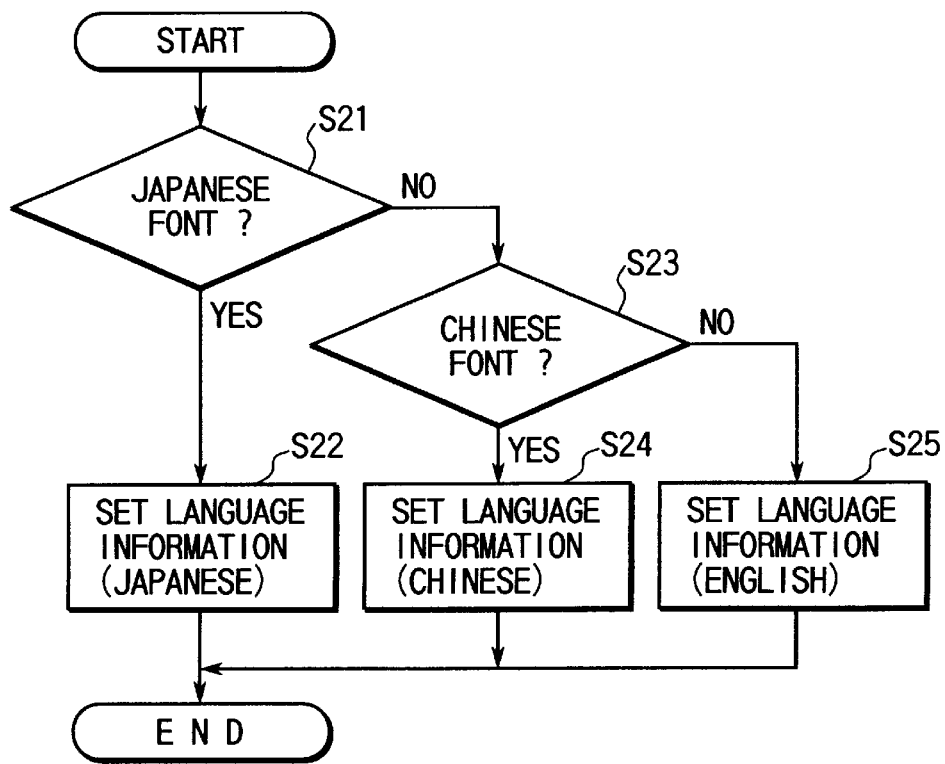
FIG. 15 is a flow chart showing language recognition processing in the multiple language input system.

The above language recognition processing and automatic switching of target languages upon this processing will be described by describing first language recognition processing with reference to the flow chart of FIG. 15; and second language recognition processing with reference to the flow chart of FIG. 16.

As described above, language recognition processing is executed very time the application 20 is activated or the format or font is changed on the application 20. When the application 20 is activated, the multiple language input system 21 receives application information (pieces of font and format setting information corresponding to each language and an identifier indicating the application type) from the application 20. When the format or font is changed on the application 20, the resultant information is notified as application information.

The first language recognition processing in FIG. 15 will be described first.

The multiple language input system 21 checks on the basis of this application information whether a Japanese font is set (step S21). If the set font is the Japanese font (YES in step S21), the input target language is recognized as Japanese, and the corresponding information is set in the automatic language recognition section 24 (step S22). With this operation, the multiple language input system 21 executes input processing for an input character string by using the Japanese processing section 25.

If the set font is not the Japanese font (NO in step S21), the multiple language input system 21 checks in accordance with the application information whether a Chinese font is set (step S23). If the set font is the Chinese font (YES in step S23), the input target language is recognized as Chinese, and the corresponding information is set in the automatic language recognition section 24 (step S24). With this operation, the multiple language input system 21 executes input processing for an input character string by using the Chinese processing section 29.

If the set font is not the Chinese font (NO in step S23), the multiple language input system 21 recognizes the input target language as English, and sets the corresponding information in the automatic language recognition section 24 (step S25). With this operation, the multiple language input system 21 executes input processing for an input character string by using the English processing section 27.

With the above processing, the input system recognizes the input target language in accordance with the activation of the application or change of the font. Since the respective language input systems are automatically switched in accordance with the input target language, input processing can be performed in accordance with each language without requiring the user to perform any switching operation for an input operation in each language. In this case, since the respective language input systems can be automatically switched without requiring any complicated processing such as searching each language dictionary, the input system corresponding to the input target language can be quickly driven.

The second language recognition processing will be described next with reference to FIG. 16. In the second language recognition processing, language recognition and switching of the input systems are performed in accordance with various conditions other than fonts, unlike the first language recognition processing.

First of all, the multiple language input system 21 determines the type of the application 20 on the basis of this application information. This determination processing is performed by using the identifier unique to each application in the application information. If the application is for English (YES in step S31), the input target language is recognized as English, and the corresponding information is set in the automatic language recognition section 24 (step S32).

FIGS. 7A and 7B show the sample windows in this processing. Assume that the application 20 for Japanese is switched to the application 20 for English. In this case, the application 20 sends, to the multiple language input system 21, an identifier indicating that the application is for English. With this operation, the multiple language input system 21 recognizes the input target language as English, and sets the corresponding information in the automatic language recognition section 24, thereby switching the Japanese mode to the English mode. In the English mode, English input processing is performed by using the English processing section 27.

In this case, the applications 20 include the applications for Japanese and Chinese as well as the application for English. The document preparation apparatus is designed such that when the application 20 for English is activated, i.e., the document preparation apparatus is driven as an European Language wordprocessor, only an European Language font can be generally used. In this case, therefore, it can be uniquely determined that the input target language is English. When the application 20 other than that for English is activated, i.e., the document preparation apparatus is driven as a Japanese or Chinese wordprocessor, fonts for other languages can be generally used. In this case, therefore, the input target language cannot be specified from the type of the application 20.

If the application 20 for English is not activated (NO in step S31), the multiple language input system 21 determines the type of format in accordance with the application information. If vertical writing is determined (YES in step S33), the set font is determined (step S34). If the font is the Japanese font (YES in step S34), the multiple language input system 21 recognizes the input target language as Japanese, and sets the corresponding information in the automatic language recognition section 24 (step S36). With this operation, the current mode is switched to the Japanese mode, and input words are processed through the Japanese processing section 25.

Note that a vertical writing format is used only for writing in Japanese, and only a horizontal writing format is used for writing in English and Chinese. If a font other than the Japanese font is set on the application 20 side (NO in step S34) upon recognition of the vertical writing format, the multiple language input system 21 notifies the application 20 of a message for switching the font to the Japanese font (step S36). After the notification of the message, the Japanese mode is set.

FIGS. 6A and 6B show the sample windows in this processing. When the vertical writing format is set, the current mode is switched to the Japanese mode. In this case, the multiple language input system 21 notifies the application 20 of the corresponding message to switch the current font to the Japanese font.

If the type of the application cannot be determined even from the format, the input target language is determined in accordance with the set conditions ((1) font, (2) format, and (3) priority order designated by application information).

If it is determined in step S33 that the format is not the vertical writing format, the multiple language input system 21 checks whether any conditions are set for language recognition (step S37). Note that these conditions are set by using the environment setting function on the multiple language input system 21 side, and the corresponding information is set in the automatic language recognition section 24.

If some conditions are set (YES in step S37), the multiple language input system 21 collates the set conditions with information (e.g., font information) from the application 20 to recognize the input target language (step S38), and sets the corresponding information in the automatic language recognition section 24 (step S39).

Assume that the conditions, i.e., the fonts, shown in FIGS. 8A to 8C are set as the above set conditions. In this case, if the set font is the Japanese Ming-Cho font, the multiple language input system 21 recognizes the input target language as Japanese in accordance with the condition shown in FIG. 8A. If the set font is the Chinese Ming-Cho font, the multiple language input system 21 recognizes the input target language as Chinese in accordance with the condition shown in FIG. 8B. If the set font is the Japanese Gothic font, the multiple language input system 21 recognizes the input target language as English.

If the same condition is set for the respective languages, and an input target language cannot be specified, the input target language is recognized in accordance with the priority information of the respective languages in FIG. 9. The priorities are set by using the environment setting function on the multiple language input system 21 side. The corresponding information is set in the automatic language recognition section 24. In this case, the priories given to Japanese, English, and Chinese decrease in this order. If, for example, the same condition is set for Japanese and English, Japanese is recognized preferentially.

If such conditions are not set (NO in step S37), the input target language is determined in accordance with the default rule. More specifically, if the font used by the application 20 is a Japanese font (YES in step S40), the multiple language input system 21 recognizes the input target language as Japanese, and sets the corresponding information in the automatic language recognition section 24 (step S41). If the font used by the application 20 is a Chinese font (YES in step S42), the multiple language input system 21 recognizes the input target language as Chinese, and sets the corresponding information in the automatic language recognition section 24 (step S43).

If the font is neither a Japanese font nor a Chinese font (NO in step S40 and NO in step S42), the multiple language input system 21 recognizes the input target language as English, and sets the corresponding information in the automatic language recognition section 24 (step S44).

When the input target language is recognized, and the corresponding information is set in the automatic language recognition section 24 in this manner, the multiple language input system 21 switches the language modes on the basis of the information set in the automatic language recognition section 24.

If, for example, the input target language is Japanese, the current mode is switched to the Japanese mode (the Japanese mode is set), and input processing unique to Japanese (kana/kanji conversion processing) is executed through the Japanese processing section 25. The processing result is returned to the application 20. If the input target language is English, input processing unique to English (spelling check) is executed through the English processing section 27. The processing result is returned to the application 20. If the input target language is Chinese, input processing unique to Chinese (pin yin conversion processing) is performed through the Chinese processing section 29. The processing result is returned to the application 20.

With the above processing, the input target language is recognized in the input system in accordance with the activation of the application or changes in various settings such as the font. Since the respective language input systems are automatically switched in accordance with the input target language, input processing can be performed in accordance with each language without requiring the user to perform any switching operation for an input operation in each language. In this case, since the respective language input systems can be automatically switched without requiring any complicated processing such as searching each language dictionary, the input system corresponding to the input target language can be quickly driven.

The spelling check function in the English mode will be described next with reference to FIG. 16.

Figure 16:
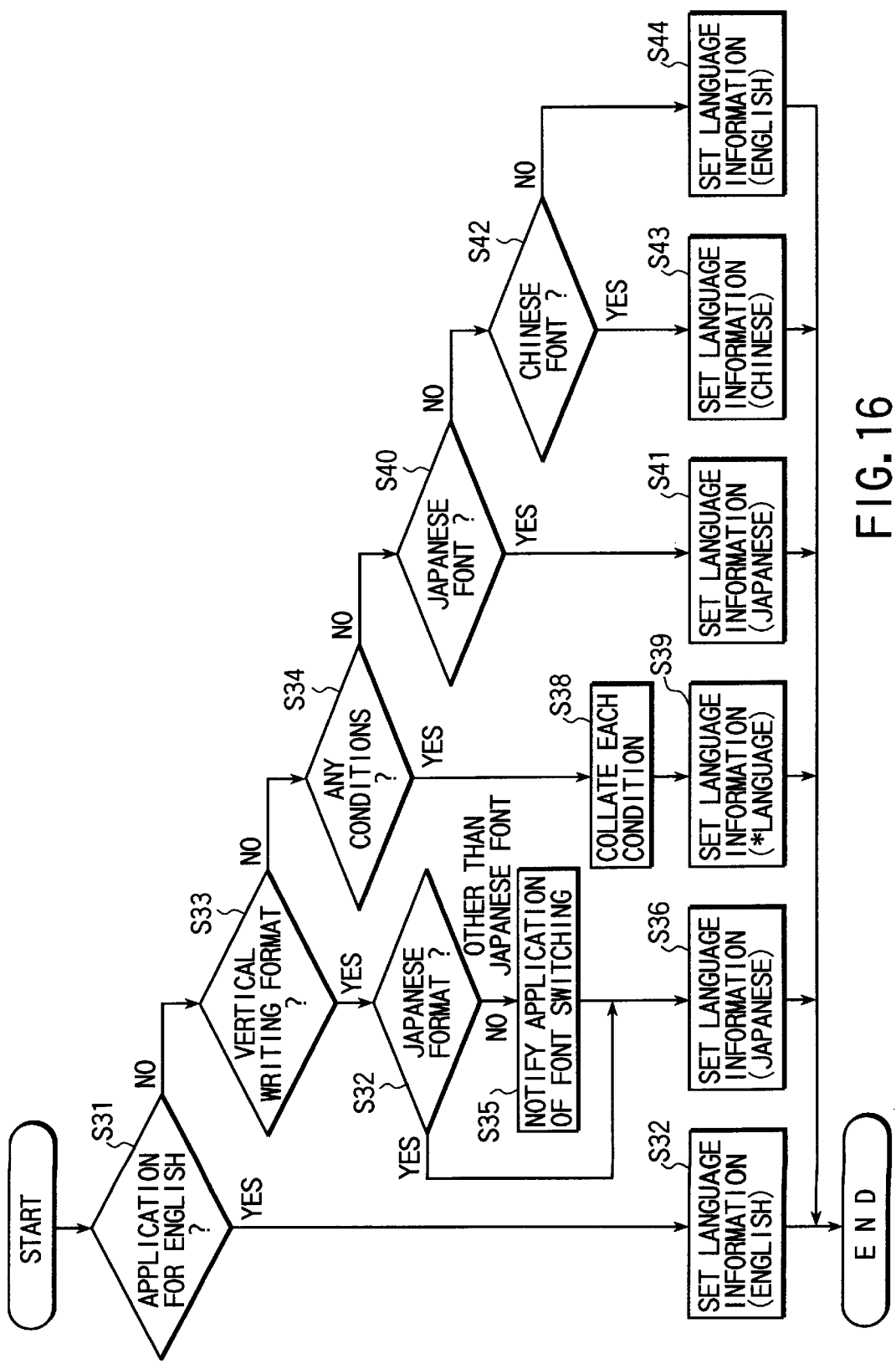
FIG. 16 is a flow chart showing a modification of the language recognition processing in FIG. 15.
Figure 17:
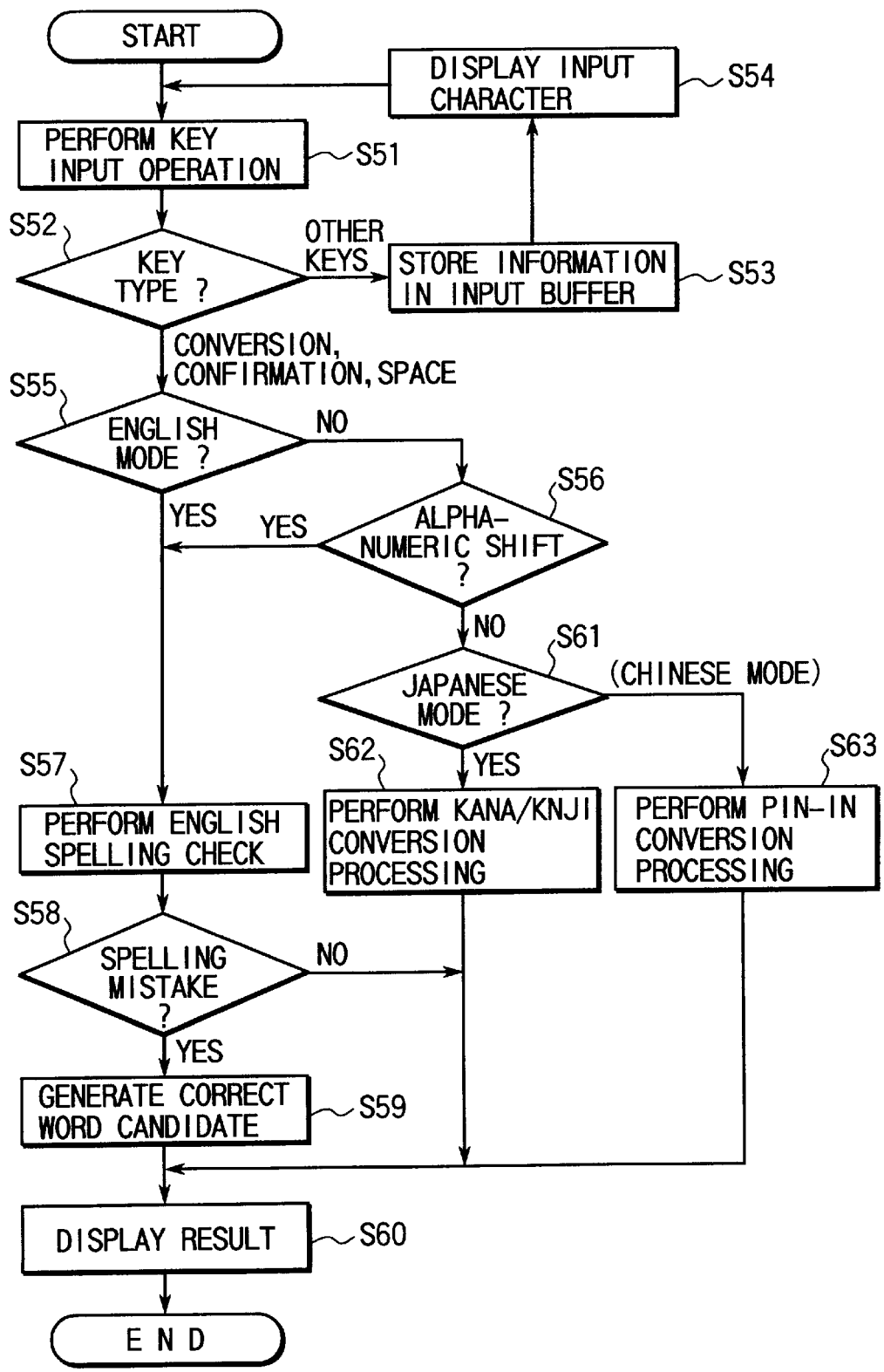
FIG. 17 is a flow chart showing spelling check in the multiple language input system.

FIG. 16 is a flow chart showing spelling check in the multiple language input system 21. The multiple language input system 21 receives characters, function key information, or the like from a keyboard or the like through the input section 22 (step S51). If the information is input from character keys (step S52), the multiple language input system 21 stores the input character string in the input buffer 12b (step S53), and displays it on the display unit 14 through the output section 31 (step S54).

If the type of the key from which the information is input is a conversion designation key (the "space" key in the English mode) or a confirmation key (step S52), the multiple language input system 21 checks whether English spelling check is required.

If the language mode determined by the automatic language recognition section 24 is the English mode (YES in step S55), or the alphanumeric shift mode other than the English mode is determined (YES in step S56), the multiple language input system 21 determines that spelling check is required, and executes spelling check (step S57).

If the determined language mode is the English mode, the multiple language input system 21 causes the English processing section 27 to search the English dictionary 28 on the basis of an input word (English word) to check whether the word is misspelled. If the alphanumeric shift mode, other than the English mode, is set, the multiple language input system 21 causes the Japanese processing section 25 or the Chinese processing section 29 to search the English dictionary 28 on the basis of the input word (English word) to check whether the word is misspelled. If a spelling mistake is detected (YES in step S58), the processing section which has executed the above search further refers to the English dictionary 28 to generate a correct word candidate for this word (step S59).

The multiple language input system 21 displays the generated correct word candidate through the output section 31 (step S60). In this case, two display methods are available, i.e., a method of displaying the misspelled word with a warning mark (e.g., an underline), as shown in FIG. 10, and a method of displaying the correct word candidate in another window (correct word candidate display portion 64), as shown in FIGS. 11 to 13. It is preferable that these methods be arbitrarily selected by the user using the environment setting function on the multiple language input system 21 side.

If the alphanumeric shift mode is not set (NO in step S56), and the Japanese mode is set (YES in step S61), the multiple language input system 21 performs kana/kanji conversion processing through the Japanese processing section 25 (step S62), and displays the processing result (step S60). If the Chinese mode is set (NO in step S61), the multiple language input system 21 performs pin yin conversion processing through the Chinese processing section 29 (step S63), and displays the processing result.

In this manner, the multiple language input system 21 determines the necessity of English spelling check, and performs spelling check by using the processing section corresponding to the currently set mode if it is determined that spelling check is required. In a prior art, a spelling check function exits as a function of the application 20. When, therefore, the application 20 is complete, the spelling check function cannot be used in some case. According to the present invention, however, since the spelling check function (English input system) is incorporated in the multiple language input system 21, the spelling check function can be used regardless of the type of the application 20.

In the above embodiment, the three types of languages, i.e., Japanese, English, and Chinese, are input. However, the present invention is not limited to this, and other types of languages can be input.

The techniques described in the above embodiment can be written as computer-executable programs in a recording medium such as a magnetic floppy (a floppy disk, a hard disk, or the like), an optical disk (CD-ROM (compact Disk Read-Only Memory), a DVD (Digital Video Disk), or the like), or a semiconductor memory to be applied to various apparatuses, or can be transmitted through a communication medium to be applied to various apparatuses.

Figure 18:
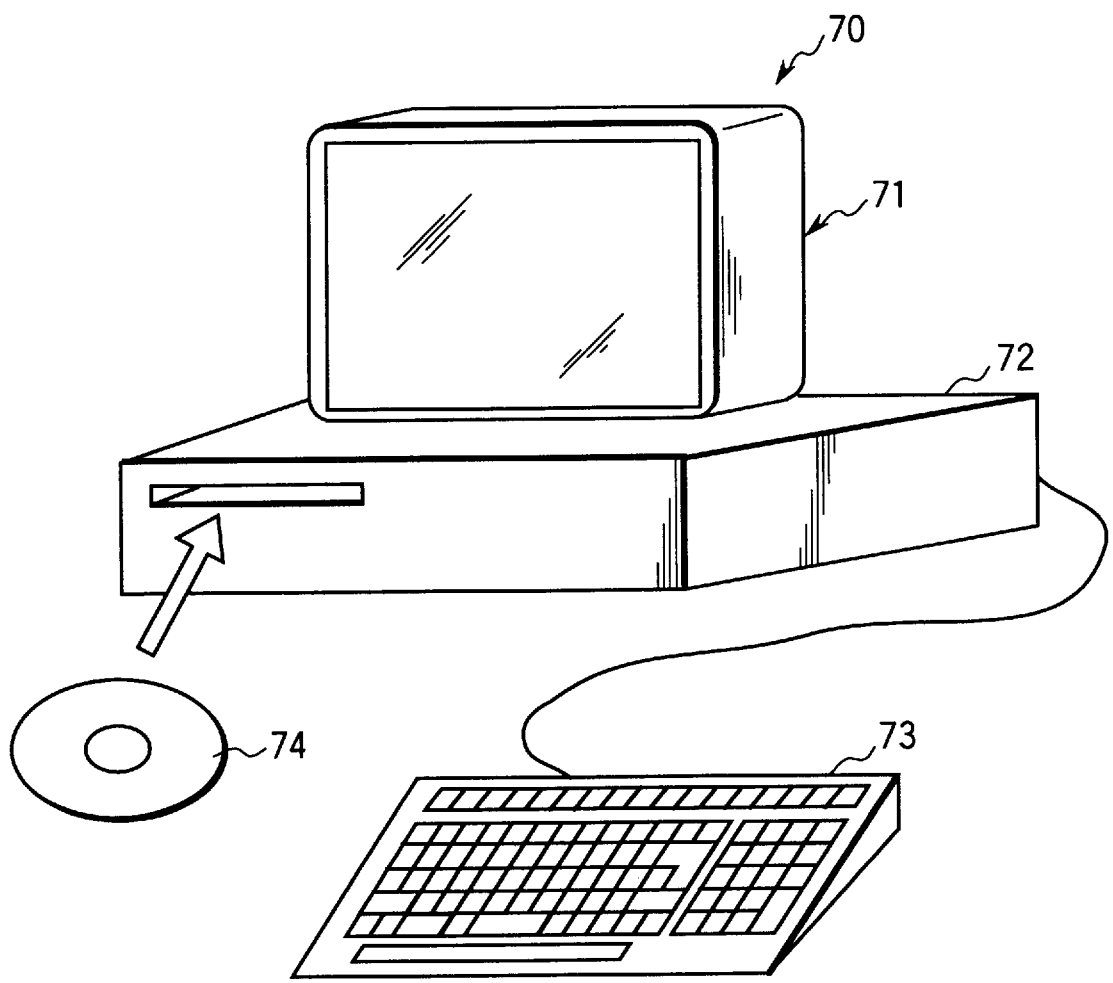
FIG. 18 is a perspective view showing a computer-readable storage medium in which the multiple language input system of the present invention is stored, and a computer capable of reading out the system.

FIG. 18 shows a document preparation apparatus implemented in this manner. This document preparation apparatus is implemented by a computer having a display 71, a main body 72, and a keyboard 73. A CD-ROM driver is incorporated in the main body 72.

The multiple language input system of the present invention is stored in a CD-ROM 74 as programs which can be read out by the computer 70. The computer 70 can execute the same processing as that in the above embodiment by reading out the programs from the CD-ROM 74 through the CD-ROM drive.

As described above, according to the present invention, input systems for a plurality of languages are prepared to be switched and used. A document using a plurality of languages can be efficiently created without preparing dedicated input systems for the respective languages as in the prior art.

In addition, according to the present invention, an input target language is recognized on the basis of, for example, the font or format information or the like set on the application side or the switching information set on the input system side, and the respective language input systems are automatically switched in accordance with the input target language. Input processing corresponding to each language can therefore be performed without requiring the user to perform a switching operation for input processing in each language. In this case, since the respective language input systems can be automatically switched without requiring any complicated processing such as searching each language dictionary, the input system corresponding to the input target language can be quickly driven.

Furthermore, according to the present invention, when the format setting information obtained from an application indicates vertical writing, the input target language is recognized as Japanese. In this case, if the font setting information obtained from the application indicates a font other than the Japanese font, a message for switching the font to the Japanese font is notified to the application. The font setting can be corrected on the application side in accordance with the current target language.

Moreover, according to the present invention, since the spelling check function is implemented as a function of the input system, the spelling check function can be used regardless of the type of application currently used.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. A multiple language input system comprising:

input means for inputting character data;

a plurality of language dictionaries each storing word information about a corresponding one of different languages;

a plurality of language processing means provided for the respective languages, each of said language processing means processing the input character data in accordance with the word information in a corresponding one of said plurality of language dictionaries; and control means for enabling one of said plurality of language processing means in accordance with an input target language, wherein:

said control means includes recognition means for recognizing the input target language as one of the plurality of languages, and enables one of said language processing means in accordance with the recognition result obtained by said recognition means;

said recognition means recognizes the input target language in accordance with font information set through an arbitrary application executed on said multiple language input system;

said recognition means recognizes the input target language in accordance with format information set through an arbitrary application executed on said multiple language input system; and said control means sends a font changing command to the arbitrary application wherein the formation information includes vertical writing, and the font information set through the arbitrary application indicates a font other than a Japanese font.

2. A multiple language input method applied to a computer system, comprising:

inputting character data;

recognizing an input target language as one of a plurality of languages;

enabling one of a plurality of language processing sections, each having word information provided for a corresponding one of a plurality of languages, in accordance with the recognition result obtained in recognizing the input target language; and processing the input character data by using the word information in said enabled language processing section, wherein:

said recognizing of the input target language includes recognizing the input target language in accordance with format information set through an arbitrary application executed on said computer system; and said enabling of one of a plurality of language processing sections includes sending a font changing command to the arbitrary application when the format information indicates vertical writing, and the font information set through the arbitrary application indicates a font other than a Japanese font.

3. A computer-readable memory storing computer-executable program code for performing processing for a plurality of languages, the program code comprising:

first means for causing a computer to input character data;

second means for causing a computer to recognize an input target language as one of a plurality of languages;

third means for causing a computer to enable on of a plurality of language processing sections, each having word information provided for a corresponding one of the plurality of languages, in accordance with the recognition result; and fourth means for causing a computer to process the input character data by using the word information in said enabled language processing section, wherein the third means causes a computer to send a font changing command to the arbitrary application when the format information indicates vertical writing, and the font information set through the arbitrary application indicates a font other than a Japanese font.

* * * * *